United States Patent [19]

Slusarski

[11] 3,729,578

[45] Apr. 24, 1973

[54] METHOD AND APPARATUS FOR MODIFYING ELECTRICAL SIGNALS

[75] Inventor: John F. Slusarski, Fort Wayne, Ind.

[73] Assignee: The Magnavox Company, Fort Wayne, Ind.

[22] Filed: Aug. 4, 1971

[21] Appl. No.: 169,018

[52] U.S. Cl. .......... 178/5.4 HE

[51] Int. Cl. .......... H04n 9/12

[58] Field of Search .......... 178/5.2 R, 5.4, 5.4 M, 178/5.4 HE

[56] References Cited

UNITED STATES PATENTS 3,255,305 6/1966 Chatten .......... 178/5.4

*Primary Examiner*—Richard Murray

*Attorney*—Richard T. Seeger

[57] ABSTRACT

A circuit for providing natural looking flesh color in a color television apparatus which uses plural color outputs, such as R–Y, B–Y, and G–Y, to constitute the color signal. In a correction circuit, the R–Y and B–Y signals are processed by clipping and the clipped portions represent phase independent amplitudes of red and yellow respectively. The red amplitude is added to the G–Y output to subtract magenta, and subtracted from the B–Y output to add yellow for a more fleshlike appearance.

The yellow amplitude is added to the R–Y output to increase the red components making the yellow more fleshlike and subtracted from the green, or adding magenta, to make the yellow more fleshlike.

The above corrections are made to a predetermined color wheel segment without substantially affecting the remaining segment.

15 Claims, 17 Drawing Figures

Patented April 24, 1973 3,729,578

7 Sheets-Sheet 1

INVENTOR.
JOHN F. SLUSARSKI
BY

Richard Steiger
ATTORNEY

Patented April 24, 1973 3,729,578

7 Sheets-Sheet 2

INVENTOR.
JOHN F. SLUSARSKI
BY
Richard [signature]
ATTORNEY

INVENTOR.
JOHN F. SLUSARSKI
BY
ATTORNEY

INVENTOR.
JOHN F. SLUSARSKI
BY
ATTORNEY

INVENTOR.
JOHN F. SLUSARSKI
BY

ATTORNEY

*INVENTOR.*
JOHN F. SLUSARSKI
*BY*

Richard Shapiro
*ATTORNEY*

INVENTOR.
JOHN F. SLUSARSKI
BY

ATTORNEY

METHOD AND APPARATUS FOR MODIFYING ELECTRICAL SIGNALS

A BRIEF SUMMARY OF INVENTION

It has been desired in the color television industry to provide a transmission-reception system which tends to make flesh colors on the TV receiver that are acceptable to TV viewers, thereby minimizing the need for adjustments in the hue control as cameras or different program material are used on the same channel.

In NTSC color television, the chroma is transmitted and then demodulated to signal components along two axes, such as the R–Y or "red" axis and the B–Y or "-blue" axis, from which the G–Y or green component may be determined. If a color has a blue component, there will be an output from the blue axis signal; if a color has a red component, there will be an output from the red axis signal; and if there is a green component in the color scene, there will be an output from the green axis signal.

This invention recognizes that by clipping a portion of the signals along certain of the axes, weighting these portions, and adding or subtracting the weighted portions to or from other of the color outputs, color correction can be obtained for a given sector of the color circle or wheel and colors from either side of a given color can be drawn toward that given color, without having any substantial affect on the colors in the remaining sector, thereby improving over systems which correct only along one axis.

Also, this invention teaches obtaining the correction portions before any matrixing is performed, simplifying the task of color correction.

In a preferred embodiment for pulling signals in a sector 45° on either side of flesh towards the flesh vector, which is at 123°, the above is accomplished by clipping the negative half of the signal from the B–Y demodulator, which negative half is present when a signal having a yellow component is being transmitted and represents the yellow component, weighting the clipped signal, and adding to the R–Y output thereby swinging the yellow that is being transmitted towards a flesh color (red makes yellow more flesh appearing). Also, the clipped, weighted yellow amplitude is subtracted from the G–Y output to add a minus green signal, or magenta, to the color picture to further make the yellow look more fleshlike.

In addition to swinging colors on the red side of flesh towards flesh, the clipped, weighted R–Y (red) demodulator signal is subtracted from the B–Y output which in effect adds yellow to the picture swinging red toward flesh. If desired, the R–Y output may also be added to the G–Y output to add green (subtract red) from the picture.

These and other advantages will become more apparent when a preferred embodiment is considered in connection with the following drawings.

Figure 3A:
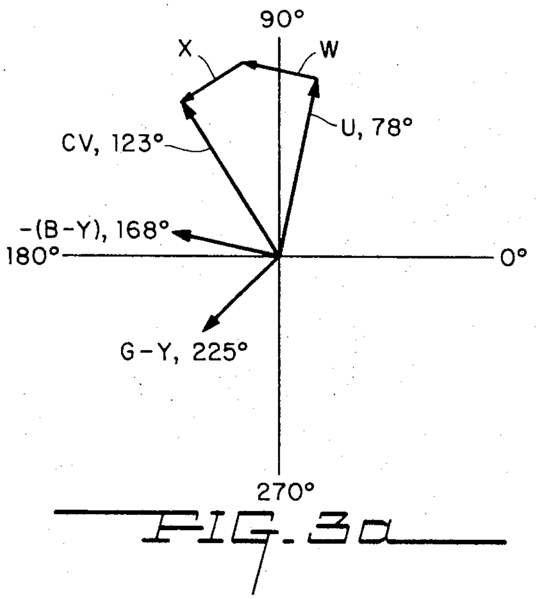
Figure 3B:
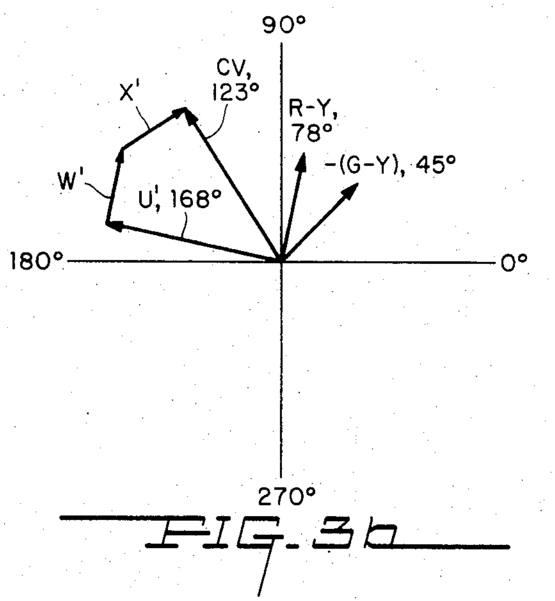
Figure 5:
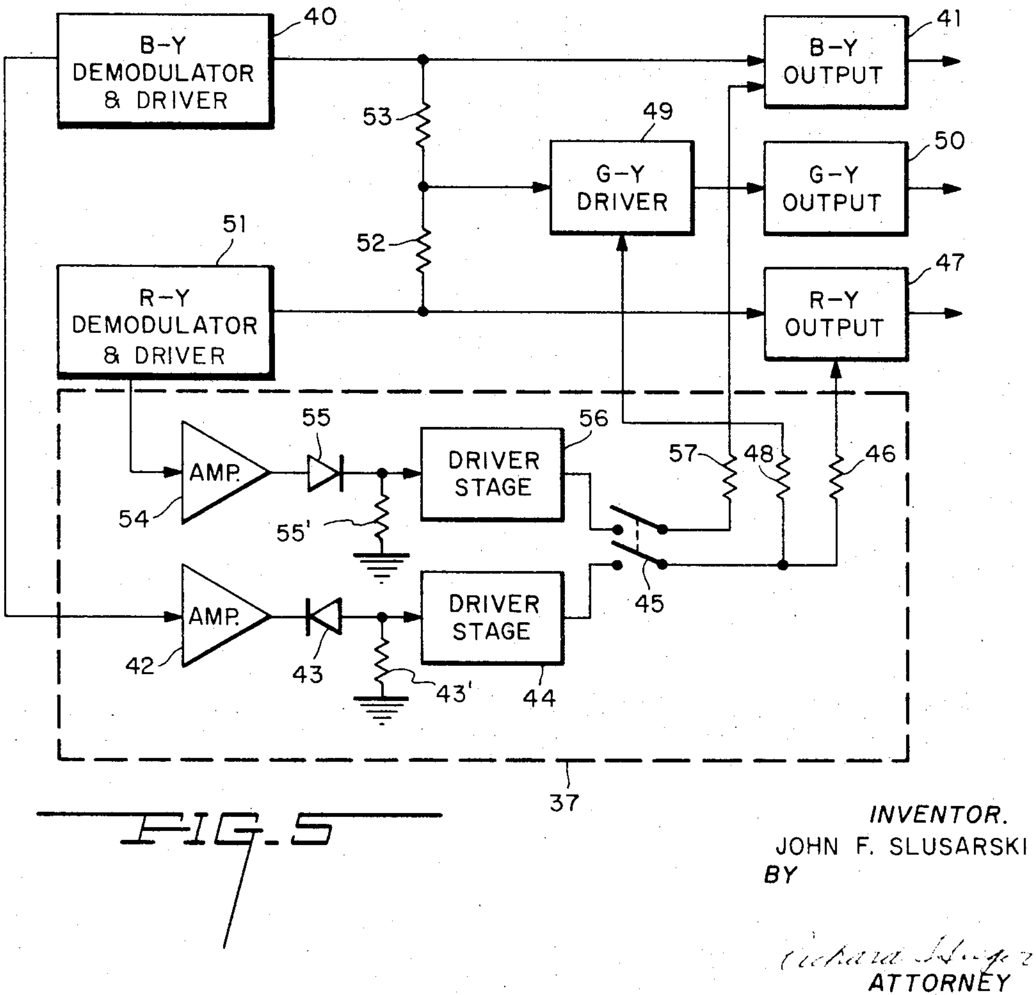
Figure 4:
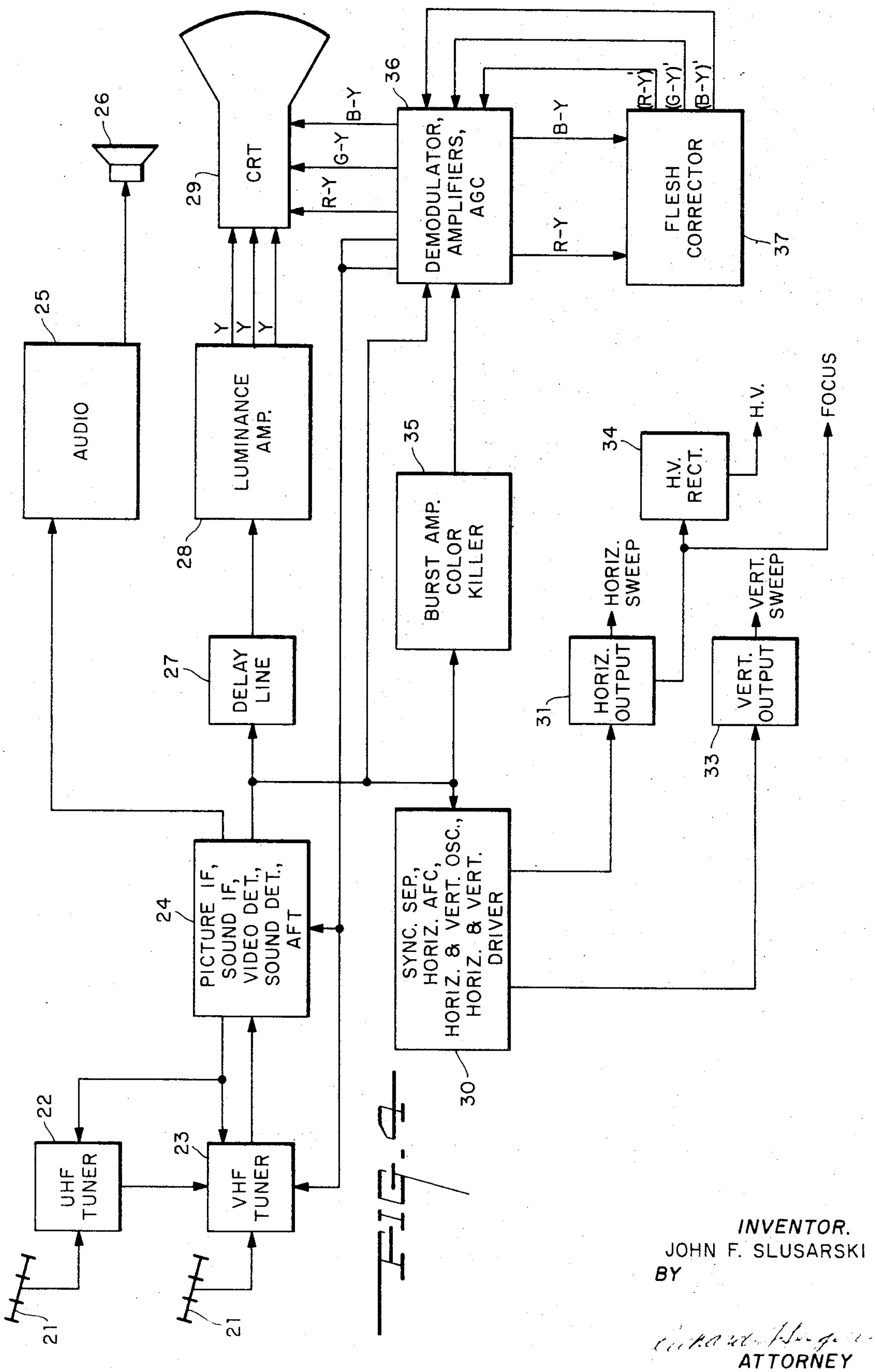
Figure 6:
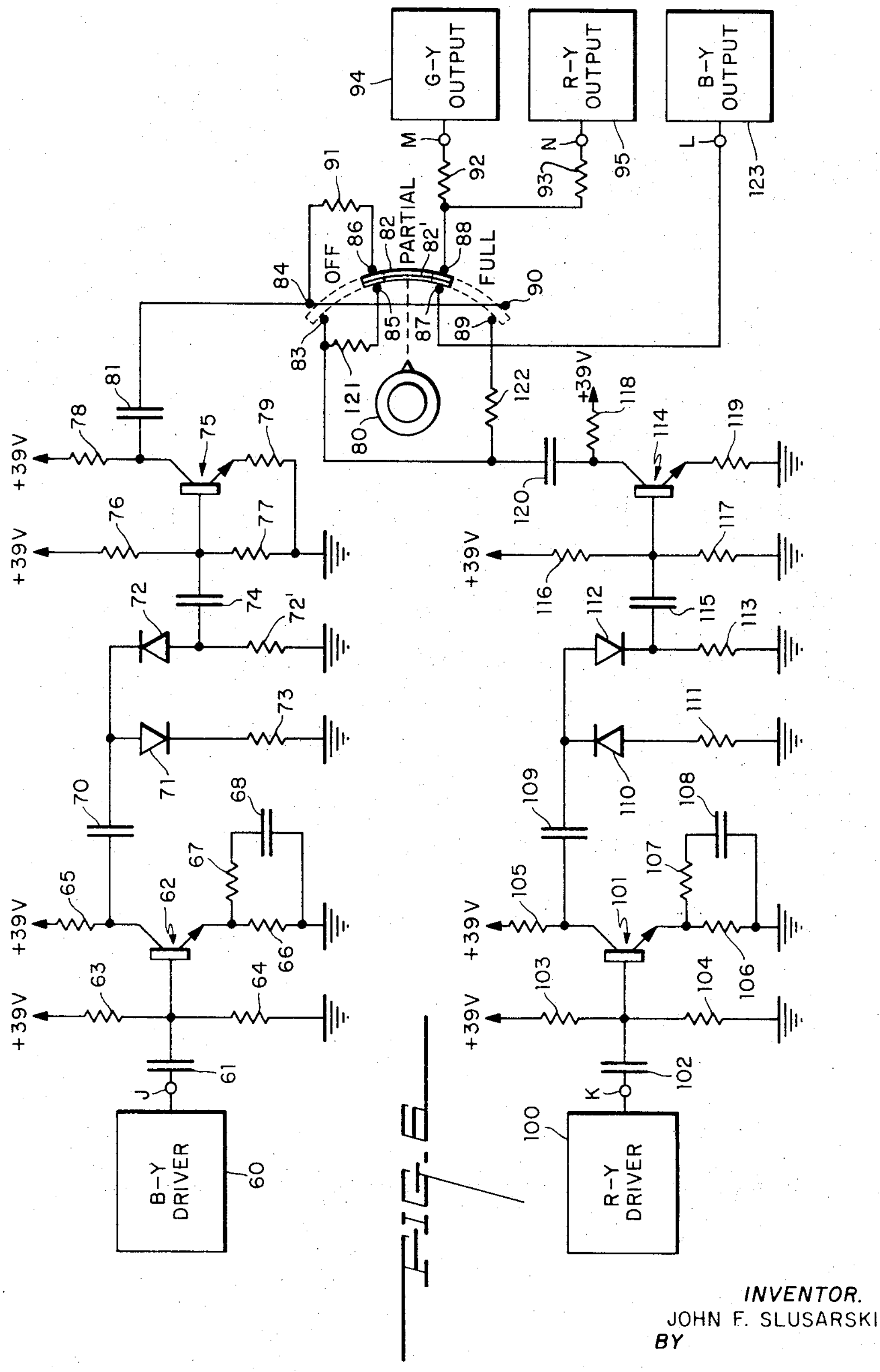
Figure 2:
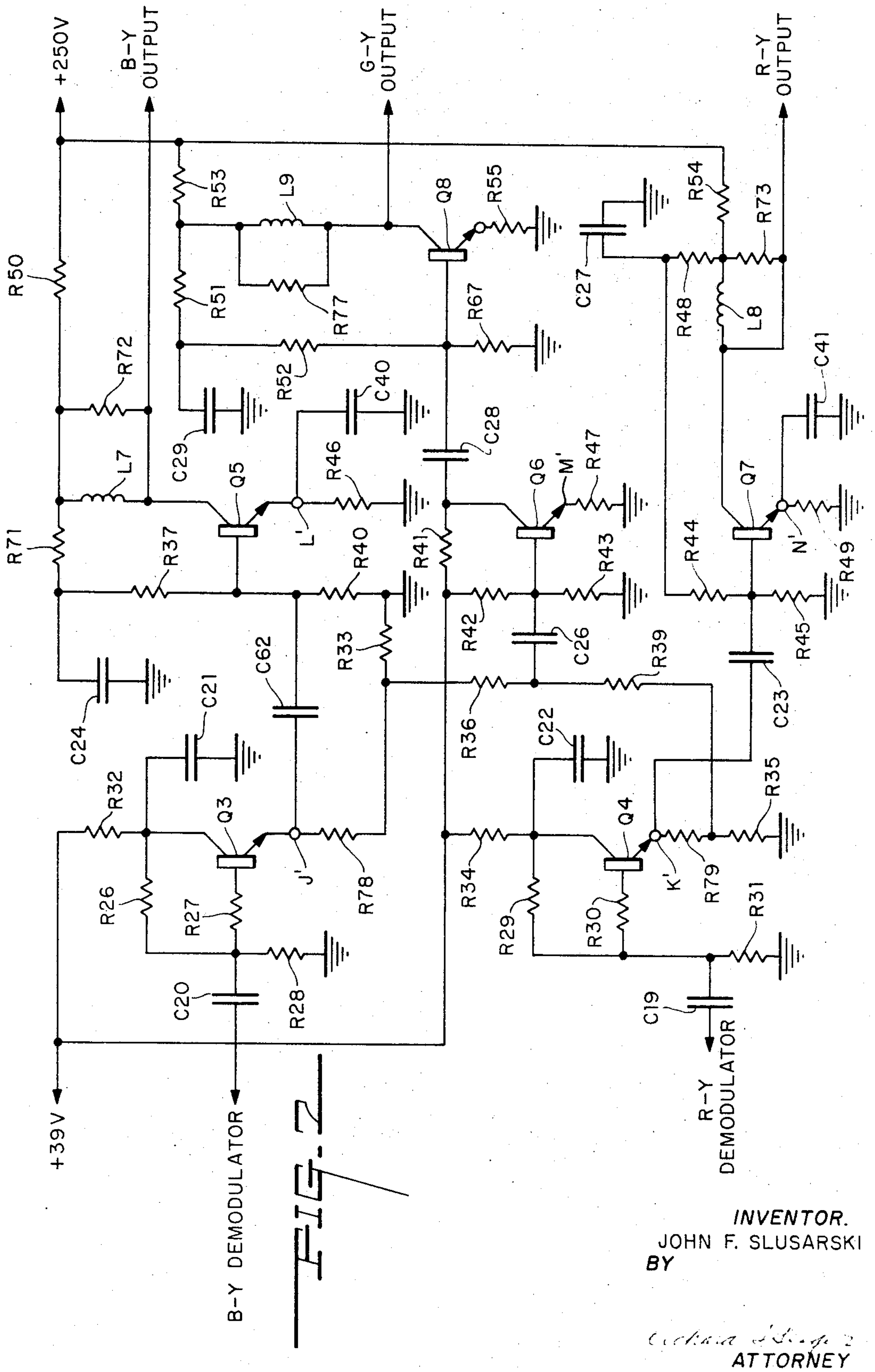

FIG. 3*a* is a vector diagram showing a leading correction to a color vector;

FIG. 3*b* is a vector diagram showing a lagging correction to a color vector;

FIG. 4 is a block diagram of a TV receiver showing a color corrector circuit;

FIG. 5 is a block diagram of the color corrector circuit in a preferred embodiment;

FIG. 6 is a schematic diagram of the color corrector portion of a preferred embodiment;

FIG. 7 is a schematic diagram of the matrixing and output circuit of a TV receiver used with the color corrector circuit of FIG. 6;

FIGS. 8 to 10 are quad bar diagrams of test results obtained from a preferred embodiment of this invention.

THEORY OF OPERATION

Figures 1, 2:
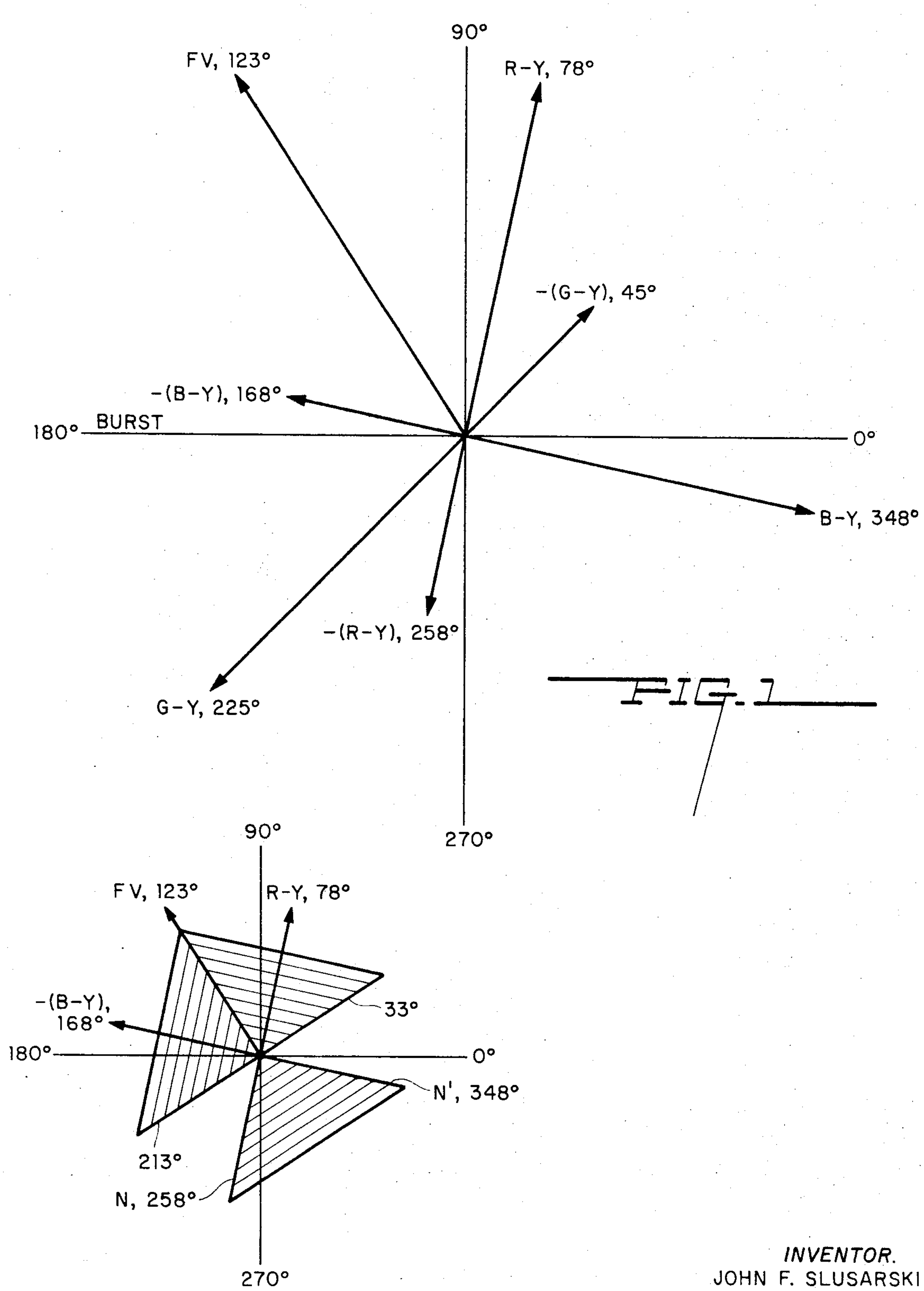
FIG. 1 is a color wheel diagram showing the demodulation axes and the desired flesh color vector.
FIG. 2 is a vector diagram showing the range of colors corrected.

FIG. 1 is a color wheel diagram showing three demodulator axis vectors, R–Y at 78°, G–Y at 225°, and B–Y at 348°, and their negative axes –(R–Y) at 258°, –(G–Y) at 45° and –(B–Y) at 168° respectively, and the flesh vector at 123°.

As used herein, a minus sign before a vector quantity indicates a direction 180° from the vector indicated as negative.

It is seen that the –(B–Y) axis leads the flesh vector by 45° and the R–Y axis lags the flesh vector by 45°. Color component signals along the R–Y axis are given a lead correction and colors along the –(B–Y) axis are given a lag correction, thereby making the circuit flesh correcting from two directions.

FIG. 2 shows the approximate range of color vectors corrected, that is, from 33° to 213°, for the case where R–Y is at 78° and the –(B–Y) axis is at 168°. Any vector outside of this range would have a very small projection on the R–Y and –(B–Y) axes and, therefore, would have a very small correction. In fact, there is no projection on these axes in the 90° sector formed by the vectors N at 258° and N′ at 348°, since the vector 258° is 90° from the –(B–Y) axis and its projection on that axis is zero, and the vector 348° is 90° from R–Y at 78° and its projection on that axis is zero.

Before going into an explanation of a preferred embodiment, a look at FIGS. 3*a* and 3*b* will aid in an understanding of this invention. In FIG. 3a a vector diagram shows the correction to an uncorrected color vector U at 78°. A correction vector W, which is the result of a negative signal fed to the B–Y output, and correction vector X, which is a result of a positive signal fed to the G–Y output, bring the uncorrected vector U to corrected vector CV, which is at the desired flesh color.

In FIG. 3*b*, correction from the other direction is obtained. Uncorrected vector U′ has added thereto vector W′, which is the result of a positive signal being added to the R–Y output, and a vector X′, which is the result of a negative signal added to the G–Y output to bring the uncorrected vector U′ to the corrected vector CV, at the desired flesh color.

DESCRIPTION OF A PREFERRED EMBODIMENT

In FIG. 4 is a block diagram of a color television receiver and for the most part will be only briefly described since the operation in general is well known to those in the art. A signal is received at antennas 21, tuned at tuners 22, 23 with the tuned signal being detected at detector 24 and an automatic fine tuning signal is fed back from detector 24 to tuners 22, 23. The sound portion of the signal goes to audio circuit 25 and speaker 26.

The picture signal has synchronizing chroma, and luminance portions with the luminance, or Y, signal going to delay line 27 for a delay corresponding to that encountered in the chroma circuit, and then to luminance amplifier 28 and then to CRT 29. The synchronizing signal goes to sync separator, and horizontal and vertical driver circuit 30, and from there to horizontal output 31 and vertical output 33.

Horizontal output 31 supplies a signal to high voltage rectifier 34 which supplies the high voltage for the CRT 29 and also supplies focus voltage to CRT 29.

The chroma signal goes to bandpass amplifier, burst amplifier, and color killer 35 and from there to demodulator 36 which demodulates and matrixes the signal to obtain R–Y, B–Y, and G–Y signals which are applied to CRT 29 and supplies R–Y and B–Y to color corrector circuit 37. Circuit 36 also supplies AGC signals for tuner 23 and detector 24. Circuit 37 supplies color correction signals (R–Y)', (B–Y)', and (G–Y)' to circuit 36. Circuit 37 and portions of circuit 36 are shown in block diagram form in FIG. 5, next described.

In FIG. 5, which is a block diagram of flesh corrector 37 and associated circuitry, B–Y demodulator and driver 40 sends inverted B–Y signals to B–Y output 41, where the signal is inverted, and to amplifier 42 where it is also inverted. Diode 43 is poled so that it clips the negative or yellow portion of the B–Y signal and sends this to driver 44, where it is inverted and sent through switch 45, when closed, and proportioning resistor 46 to R–Y output 47. Switch 45 is the color correction switch and when closed will enable the circuit to color correct and when open, the receiver will operate without color correction. Resistance 46 is chosen so that when in combination with the resistors in the receiver, it will add the desired amount of R–Y signal to change the yellow to a more flesh appearing color. This in effect adds vector W' in FIG. 3*b*. The values of 46 and matrixing resistors in a preferred embodiment are given for FIGS. 6 and 7 to be subsequently described.

The signal from driver 44 is also proportioned by resistor 48 and sent to G–Y driver 49 and hence to G–Y output 50 where it is inverted. This in effect adds vector X' in FIG. 3*b* to further correct and bring the uncorrected color to a flesh color at vector CV, 123°. It can be seen these are amplitude additions to obtain the vector change thereby simplifying setup and adjustment over systems requiring phase changes to obtain the correction.

R–Y demodulator and driver 51 and B–Y demodulator and driver 40 send signals through matrixing resistors 52, 53 respectively to obtain the G–Y signal to driver 49. Inverted R–Y signals from R–Y demodulator 51 are sent to R–Y output 47, where a signal inversion takes place, and to amplifier 54 where the signals are also inverted. Diode 55 is poled to clip the positive or red portion of the R–Y signal, where it goes to driver stage 56, where the signal is inverted, passed through switch 45, when closed, through proportioning resistor 57 and then to the B–Y output 41. This in effect adds vector W in FIG. 3*a*. With proper proportioning of the resistors, it has been found that satisfactory results are obtainable without correction vector X in FIG. 3*a*, although, or course, this could be accomplished by sending the signal from driver stage 56 to the G–Y output 50 through a proportioning resistor. Resistances 43' and 55' are clipper driving impedances. Also, in FIG. 5, unless indicated, no signal inversion takes place.

FIG. 6 is a schematic diagram corresponding to the block diagram in FIG. 5. B–Y demodulator 60 is connected through blocking capacitor 61 to the base of amplifying transistor 62. Resistors 63, 64, 65, and 66 are biasing resistors for transistor 62. Resistor 67 and capacitor 68 are chosen to keep the a.c. impedance low in the emitter circuit of transistor 62 for increased gain at its collector.

The collector output of transistor 62 is connected through blocking capacitor 70 to diodes 71, 72 with diode 71 passing positive signals to ground through resistor 73. The negative portion of the signal is taken off the anode of diode 72, which is biased by resistor 72 to ground, and sent through d.c. blocking capacitor 74 to the base of amplifier transistor 75. Resistors 76, 77, 78, and 79 are biasing resistors for transistor 75.

The collector output of transistor 75 is connected to switch 80 through d.c. blocking capacitor 81.

Switch 80, which may be manually controlled, functions to switch in both the B–Y and R–Y corrections with contacts 84, 86, 88, and 90 switching in the B–Y corrections and contacts 83, 85, 87, and 89 switching in the R–Y corrections which are developed in the lower portion of the FIG. 6 schematic and will be later described. Switch 80 has three positions, off, partial, and full, for sliding contact 82, which has a strip of electrical insulation 82' through the center thereof which electrically insulates the left portion from the right portion. For the B–Y corrections when slide 82 connects terminals 84 and 86, the switch is in the off position and the circuit of FIG. 6 is not operative to color correct; when slide 82 connects terminals 86 and 88, the circuit of FIG. 6 is operative to make a partial color correction; and when slide 82 is in position to connect contacts 88 and 90, the circuit of FIG. 6 is connected to make a full color correction. Resistor 91 connects contacts 84 and 86 and matrixing resistors 92 and 93 connect contact 88 to G–Y output 94 and R– Y output 95 respectively. It is seen that when contacts 84 and 86 are connected by slide 82, the B–Y signal from transistor 75 is not connected to outputs 94, 95. When slide 82 is in the "partial" position and connects terminals 84 and 86, the output transistor 75 is connected through resistor 91 to the matrixing resistors 92 and 93 and then to outputs 94, 95 and when slide 82 is in the "-full" position, resistor 91 is removed thereby increasing the signal to matrixing resistors 92, 93 for a greater correction to outputs 94, 95.

For the R–Y correction, the signal from the R–Y demodulator 100 goes to base of amplifying transistor 101 through d.c. blocking capacitor 102. Resistors 103, 104, 105, and 106 are connected for biasing transistor 101 and resistor 107 and capacitor 108 provide a low a.c. impedance to the emitter of transistor 101 for increased gain at the collector.

The collector output of transistor 101 is connected through d.c. blocking capacitor 109 to the cathode of diode 110 where the negative portion of the signal is passed to ground through resistor 111 and the positive portion is clipped by diode 112, which has driving impedance 113, and passed to the base of amplifying transistor 114 through d.c. blocking capacitor 115. Resistors 116, 117, 118, and 119 provide biasing for transistor 114.

The R–Y correction signal from the collector of transistor 114 is sent to terminals 83, 85, 87, and 89 of switch 80 through d.c. blocking capacitor 120. Matrixing resistors 121 and 122 connect to terminals 85 and 89 respectively. In the off position, slide 82 connects terminals 83 and 85, the correction for R–Y is not effective. In the partial position, slide 82 connects terminals 85 and 87 placing matrixing resistor 121 in the circuit to B–Y output 123 and in the full position, slide 82 connects contacts 87, 89 placing matrixing resistor 122, which is lower in value than resistor 121, in the circuit to B–Y output 123, increasing the signal to B–Y output 123 for increased correction.

FIG. 7 shows an R–Y, B–Y, and G–Y driver and output circuit used with the color correction circuit of FIG. 6. The points of connection between the circuits of FIGS. 6 and 7 are shown in FIG. 6 at J, K, L, M, and N. In FIG. 7, $Q_3$, $Q_4$, $Q_5$, $Q_6$, and $Q_7$ are the transistors, respectively, of the B–Y driver, R–Y driver, B–Y output, G–Y driver, and R–Y output, and their emitters are the points of connection for points J, K, L, M, and N in FIG. 6, respectively, and are designated J′, K′, L′, M′, and N′.

FIG. 7 will now be described. A signal from the B–Y demodulator is coupled by way of capacitor C20 and biasing resistor R27 to the base of emitter follower Q3, which is the B–Y driver. Resistances R26 and R28 are also biasing resistors for Q3. R32 and C21 form a resistor capacitor filter primarily for B+ voltage.

The signal from the emitter of Q3 goes through Q3 emitter divider resistance R78, resistance R36, and a coupling capacitor 26 to the G–Y driver Q6. R36 and R39 are matrixing resistors for Q6, the G–Y driver.

R78 and R33 are Q3 emitter divider and biasing resistances. R37, R40, and R71 are base bias resistors for B–Y output transistor Q5. C24 is a filter capacitor which primarily filters out B+ supply. L7 is a peaking inductance in the collector circuit of Q5 and R72 is a damping resistor for L7. R50 is collector bias resistor for B–Y output transistor Q5. C62 is coupling capacitor between Q3 and Q5. C40 is peaking capacitor for emitter of Q5.

C19 is a coupling capacitor between the R–Y demodulator and R–Y driver transistor Q4 with resistances R29, R30, and R31 being base bias resistors for the R–Y driver Q4. R34 and C22 are a filter circuit primarily for B+ voltage. R79 and R35 are Q4 emitter divider and biasing resistances.

R42 and R43 are base bias resistors for the G–Y driver Q6 and R47 is the emitter bias resistor for Q6. R41 is collector bias resistor for Q6 and C28 is the coupling capacitor between G–Y driver Q6, and G–Y output transistor Q8. C29 is a filter capacitor, R51, R52, and R67 are base bias resistors for G–Y output Q8, R53 is collector bias resistor for G–Y output transistor Q8, L9 is a peaking inductor, and R77 is damping resistor for L9, for the output of Q8. R55 is emitter bias resistor for G–Y output Q8.

C23 is coupling capacitor between Q4 and R–Y output transistor Q7, R44, and R45 are base bias resistor for Q7, and R49 is emitter bias resistor for Q7. C41 is peaking capacitor for Q7. L8 is a peaking inductor and R73 is a damping resistor for L8. R48 is the base bias for Q7 and R54 is the collector bias for Q7. C27 is a filter capacitor.

Q3 and Q4 are emitter followers and Q5, Q6, Q7, and Q8 are common emitter amplifiers.

The values of the components shown in FIGS. 6 and 7 that were found to give satisfactory results in a preferred embodiment are:

| Element | Value | Element | Value |
|---|---|---|---|
| **61** | 4 μfd 25V | **77** | 6.8K |
| **62** | MPS A 20 | **78** | 2.2K |
| **63** | 68K | **79** | 1K |
| **64** | 5K | **81** | 4 μfd 25V |
| **65** | 4.7K | **91** | 3.3K |
| **66** | 500Ω | **92** | 5.6K |
| **67** | 180Ω | **93** | 470Ω |
| **68** | 4 μfd 25V | **102** | 4 μfd 25V |
| **70** | 4 μfd 25V | **103** | 65K |
| **71** | 116 | **105** | 4.7K |
| **72** | 116 | **106** | 560Ω |
| **72′** | 10K | **107** | 150Ω |
| **73** | 10K | **108** | 4 μfd |
| **74** | 4 μfd 25V | **112** | 116 |
| **76** | 18K | **113** | 10K |
| **115** | 4 μfd 25V | R36 | 1.2K |
| **116** | 47K | R37 | 22K |
| **117** | 6.8K | R39 | 1.2K |
| **118** | 2.2K | R**40** | 3.3K |
| **119** | 680Ω | R41 | 1.8K |
| **120** | 4 μfd 25V | R42 | 330K |
| **121** | 4.7K | R43 | 39K |
| **122** | 3.3K | R44 | 22K |
| Q3 | 142N3 | R45 | 3.3K |
| Q4 | 142N3 | R46 | 100Ω |
| Q5 | 135N1 | R47 | 330Ω |
| Q6 | 142N3 | R48 | 180 |
| Q7 | 135N1 | R49 | 82 ½W |
| Q8 | 135N1 | R**50** | 10K |
| | | R51 | 330K |
| L7 | 20 μH | R52 | 47K |
| L8 | 20 μH | R53 | 10K |
| L9 | 20 μH | R54 | 10K |
| R26 | 220K | R55 | 150Ω |
| R27 | 100Ω | R67 | 4.7K |
| R28 | 56K | R71 | 220K |
| R29 | 220K | R72 | 4.7K |
| R30 | 100Ω | R73 | 4.7K |
| R31 | 56K | R77 | 10K |
| R32 | 100Ω | R78 | 820Ω |
| R33 | 180Ω | R79 | 470Ω |
| R34 | 100 | C19 | 4.7 mfd 50 V |
| R35 | 470Ω | C20 | 4.7 mfd 50 V |
| C21 | 0.01 50V | C27 | 0.1 50V |
| C22 | 0.01 50V | C28 | 4.7 mfd 50V |
| C23 | 4.7 mfd 50V | C29 | 0.01 50V |
| C24 | 0.01 50V | C40 | 2200 |
| C25 | 4.7 mfd 50V | C41 | 2200 |
| C26 | 4.7 mfd 50V | C62 | 4.7 mfd 50V |

FIGS. 8, 9, 10 are quad bar graphs, with output in volts plotted on the ordinate and color wheel vectors on the abscissa. In all the diagrams, the reference letters represent the following vectors:

| | |
|---|---|
| WL | Grey reference bar |
| Bar A | 153° |
| Bar B | 93° |
| Bar C | 30° |
| Bar D | 0° |
| Bar E | 330° |

Figure 8A:
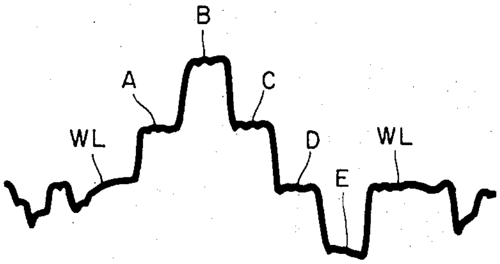
Figure 8B:
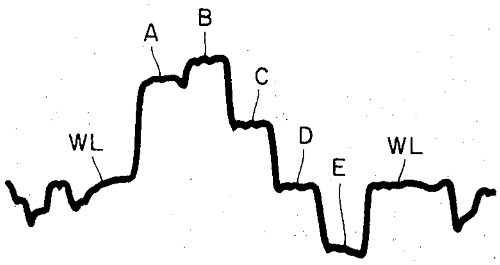
Figure 8C:
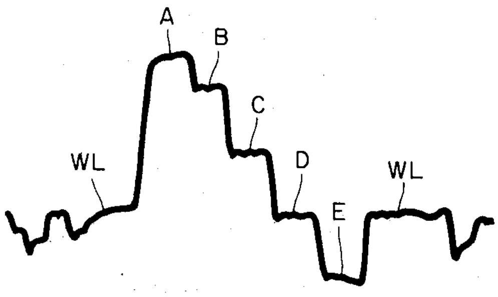

FIGS. 8*a*, 8*b*, and 8*c* are quad bar diagrams for the R–Y output for the circuit of a preferred embodiment.

In FIGS. 8*a*, 8*b*, and 8*c*, the only bar to change as the switch 80 is moved from "off", FIG. 8*a*, to partial, FIG. 8*b*, to full, FIG. 8*c* is bar A. This demonstrates the correction isolation of this invention, as do the following figures. A vector of 153° is on the yellow side of flesh and needs an R–Y correction, which, as may be seen in the quad bar diagrams 8*b* and 8*c*, increases as the switch 80 is moved from off to partial to full. The other bars which do not fall in the correction range of R–Y are substantially unaffected.

Figure 9A:
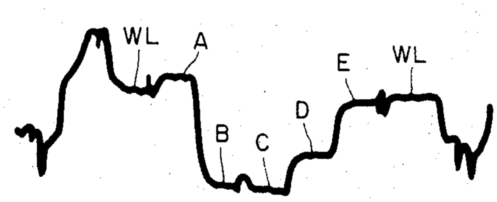
Figure 9B:
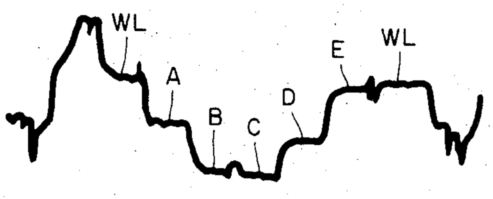
Figure 9C:
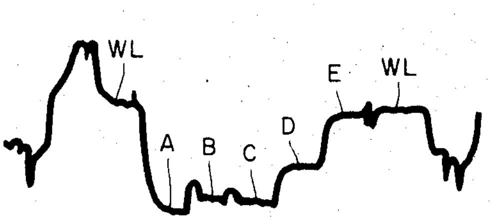

In FIGS. 9*a*, 9*b*, and 9*c*, which represent the G–Y output for quad bars A, B, C, D, E, as switch 80 is moved from off to partial to full, it is seen that bar A becomes smaller, decreasing the green input and bringing vector 153° closer to flesh, and the other bars remain substantially unaffected.

Figure 10A:
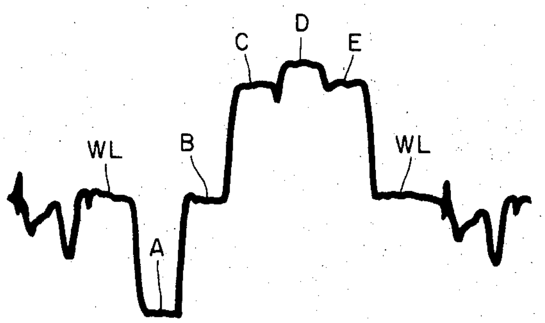
Figure 10B:
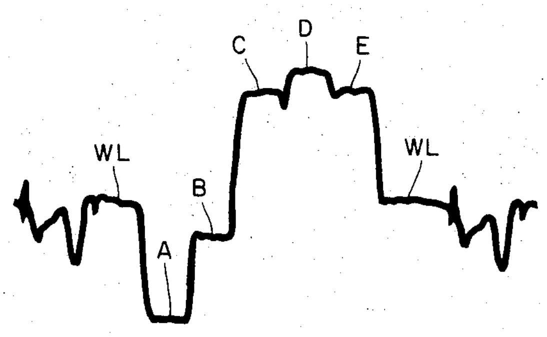
Figure 10C:
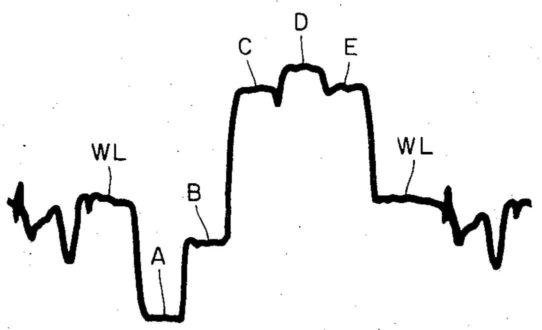

In FIGS. 10*a*, 10*b*, and 10*c*, which represent the B–Y output for quad bars A, B, C, D, and E, the A bar is not changed appreciably since it is in an area that receives substantially no B–Y correction. There is a change in the B bar, it becomes smaller, since it is on the red side of flesh and needs more yellow correction to move to flesh. It is understood that a lessening of the B–Y voltage increases yellow. Bars C, D, and E are not changed substantially since they are not in color corrected areas.

It will be understood that modifications and variations may be effected without departing from the spirit and scope of the novel concepts of this invention.

I claim:

1. Color control apparatus for a television signal comprising
 means for providing three color signals, a color signal corresponding to each of three primary colors which are used to represent a composite color representation,
 means for representing one of said three color signals along a first axis and another of said three color signals along a second axis,
 means for selecting a first signal along said first axis and processing said signal to obtain a first component signal,
 means for selecting a second signal along said second axis and processing the second axis signal to obtain a second component signal,
 means for modifying one of said signals corresponding to said primary colors with one combination of said first and second component signals and for modifying another of said signals corresponding to said primary colors with a second combination of said first and second component signals different than said one combination to modify the composite color representation in a predetermined manner.

2. Color control apparatus for a television receiver for receiving a television signal comprising
 means for providing three color signals, R–Y, G–Y, and B–Y, said color signals corresponding respectively to three primary colors which are used to represent a composite color representation,
 means for representing one of said three color signals along a first axis and another of said three color signals along a second axis substantially orthogonally related to said first axis.
 means for clipping a predetermined portion of first signal along said first axis and weighting said signal to obtain at least one first color correction signal,
 means for selecting a second signal along said second axis and weighting the second axis signal to obtain at least one second color correction signal,
 means for modifying one of the color signals corresponding to said primary colors with one and not the other of said first and second correction signals and modifying another of said color signals with at least the other and not the one of said first and second co-rection signals, to modify the composite color representation in a predetermined manner.

3. Television receiver for receiving a television signal having chroma and luminance signals therein comprising
 means for receiving and demodulating the chroma portion of said television signal to obtain R–Y and B–Y signals
 means to clip the demodulated R–Y and B–Y signals to obtain a plus R–Y signal and a minus B–Y signal,
 means to proportion said plus R–Y signal and said minus B–Y signal,
 means to obtain a G–Y signal from said B–Y and R–Y signals,
 means to add said proportioned positive R–Y signal to the positive G–Y signal and to the negative of said B–Y signal to form a modified G–Y signal and a modified B–Y signal,
 means to add the proportioned minus B–Y signal to the negative of said G–Y signal and to the positive of said R–Y signal to form modified G–Y and modified R–Y signals,
 means to display said corrected G–Y, corrected B–Y, and corrected R–Y signals in said television receiver.

4. Color control apparatus for television receiver for receiving a television signal comprising
 an R–Y demodulator for providing an R–Y signal from the received television signal,
 a B–Y demodulator for providing a B–Y signal from the received television signal,
 a first diode poled to clip the positive portion of said R–Y signal,
 a second diode poled to clip the negative portion of said B–Y signal,
 a B–Y output,
 an R–Y output,
 a G–Y output, coupled to said R–Y demodulator and said B–Y demodulator,
 weighting impedances and gain means being between said diodes and said outputs.

5. The apparatus of claim 4 with
 a first weighting impedance being between said first diode and the B–Y output,
 a second weighting impedance being between said second diode and the R–Y output,
 a third weighting impedance being between said second diode and the G–Y output.

6. The apparatus of claim 5 with
 switch means being between said first diode and said first weighting impedance,
 said switch means being between said second diode and second and third weighting impedance.

7. The apparatus of claim 6 with
 said switch means having an off, intermediate, and full position,
 fourth impedance means,
 fifth impedance means,
 said switch in said off position disconnecting the circuit between said diodes and said outputs,
 said switch means in said intermediate position connecting said first diode to said first weighting means through said fourth impedance and connecting said second diode to said second and third weighting means through said fifth impedance means, said switch means in said full position connecting said first diode to said first weighting means, and connecting said second diode to said second and third weighting means.

8. The apparatus of claim 4 with gain means comprising, first amplifier means connected to amplify said R–Y signal prior to said clipping by said first diode, second amplifier means connected to amplify said B–Y signal prior to said clipping by said second diode, third amplifier means connected between the first diode and said first weighting means to amplify the signal from said first diode to a predetermined level, fourth amplifier means connected between the second diode and said second and third weighting means to amplify the signal from said second diode to a predetermined level.

9. Color control apparatus for a television signal comprising means for representing a color signal in a color television system, means for demodulating said signal along the R–Y axis and the B–Y axis, means for clipping a portion of each of said demodulated signals, means for weighting said clipped portions of said signals in a predetermined manner, means for combining said weighted clipped portions of said signals to the color signal to swing the color wheel vectors on either side of a given color wheel vector towards said given vector to thereby correct for variations of the given vector.

10. Color control apparatus for a television signal comprising means for demodulating a color signal in a color television system along a plurality of axes to provide a plurality of demodulated signals, means for altering one of said demodulated signals according to the variations in the other demodulated signal, means for altering the other demodulated signal according to the variations in said one demodulated signal whereby color wheel vectors on either side of a given color wheel vector are moved towards the given vector to thereby correct for variations of the given vector.

11. Color control apparatus for a television signal comprising means for demodulating a color signal in a color television system to obtain R–Y and B–Y signals, means for clipping a portion of said R–Y and B–Y color signals to obtain a clipped signal having clipped portions of only said R–Y signal, and a clipped signal having clipped portions of only said B–Y signal, means for weighting these clipped portions in a predetermined manner, means for adding these clipped portions to predetermined color signals to correct color signals in a predetermined manner.

12. Television receiver for receiving a television signal having chroma and luminance signals therein comprising means for receiving and demodulating the chroma signal portion in said television signal to obtain R–Y and B–Y signals, means to clip the demodulated R–Y and B–Y signals to obtain a plus R–Y signal and a minus B–Y signal, means to proportion said plus R–Y signal and said minus B–Y signal, means to obtain a G–Y signal from said R–Y and said B–Y signals, means to add the proportioned plus R–Y signal to the minus B–Y signal to obtain a modified B–Y signal, means to add the proportioned minus B–Y signal to the negative of said G–Y signal and to said positive R–Y signal to form modified G–Y and modified R–Y signals, means to display said modified G–Y, B–Y, and modified R–Y signals on said television receiver.

13. Color control apparatus for a television signal comprising means for providing three color signals, a color signal corresponding to each of three primary colors which are used to represent a composite color representation, means for representing one of said three color signals as a first electrical quantity and another of said three color signals as a second electrical quantity, means for selecting a first portion of said first electrical quantity and processing said first portion to obtain a first component signal, means for selecting a second portion of said second electrical quantity and processing the second portion to obtain a second component signal, a means for modifying at least two of the color signals corresponding to said primary colors with at least one of said first and second portions with one of said color signals being modified by one and not the other of said component signals and another of said color signals being modified by the other and not the one component signal to modify the composite color representation in a predetermined manner.

14. A method comprising the steps of receiving a color television signal, demodulating said signal along a plurality of axes, selecting a portion of said signal along each of said plurality of axes, combining the selected portions along one of the axes with the signal along another axis and combining the selected portions along another axis with the signals along said one axis to swing the color wheel vectors on either side of a given vector towards that given vector.

15. A method comprising the steps of receiving a color television signal, demodulating the color signal to obtain R–Y and B–Y signals, clipping a portion of each of said R–Y and B–Y signals to obtain a clipped portion of said R–Y signal and a clipped portion of said B–Y signal, weighting these clipped portions in a predetermined manner, combining the R–Y clipped portions and not the B–Y clipped portions to the B–Y color signal, and combining the B–Y clipped portions, and not the R–Y clipped portions, to the R–Y color signal to correct the color signal in a predetermined manner.

* * * * *